May 7, 1946.　　C. W. HEWLETT, JR　　2,399,925
UNIDIRECTIONAL GEAR DRIVE
Filed Dec. 20, 1943

Inventor:
Clarence W. Hewlett Jr,
by Nancy E. Dunham
His Attorney.

Patented May 7, 1946

2,399,925

UNITED STATES PATENT OFFICE 2,399,925

UNIDIRECTIONAL GEAR DRIVE

Clarence W. Hewlett, Jr., Marblehead, Mass., assignor to General Electric Company, a corporation of New York Application December 20, 1943, Serial No. 514,934

5 Claims. (Cl. 74—437)

My invention relates to unidirectional drive gearing and its object is to provide a gear drive which performs its usual function while driving in one direction, but which prevents operation in the opposite direction, or, if desired, permits continuous normal operation in one direction and permits normal operation in the opposite direction except for a selected rotary position of the gears. The direction for normal operation may be selected as desired when the gears are assembled.

Figure 1:
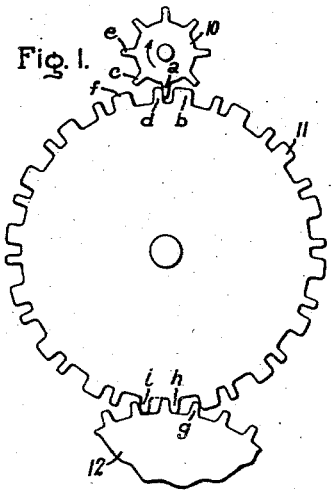
Figure 2:
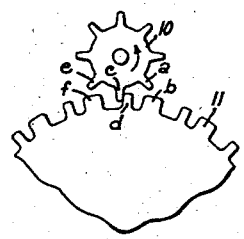
Figure 3:
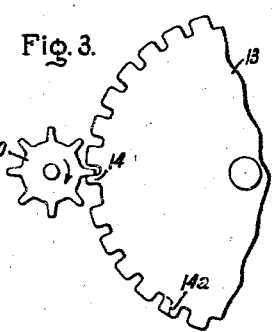
Figure 4:
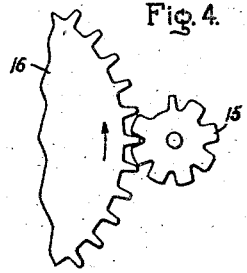
Figure 5:
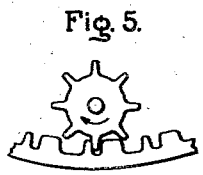
Figure 6:
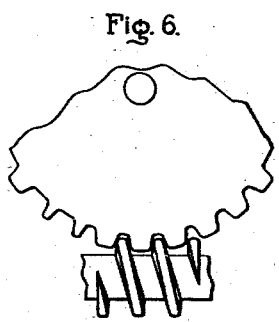
Figure 7:
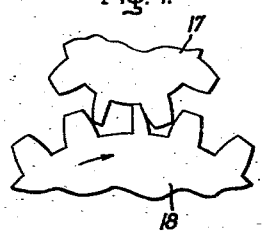

The features of my invention which are believed to be novel and patentable will be pointed out in the claims appended hereto. For a better understanding of my invention, reference is made in the following description to the accompanying drawing in which Fig. 1 represents a spur gear train including a one-way drive according to my invention. Fig. 2 is a fragmentary view of the one-way drive of Fig. 1 explanatory of the locking operation. Fig. 3 illustrates a one-way spur gear drive where the locking position is at a selected point of the larger gear. Fig. 4 illustrates a further modification of the invention; and Figs. 5 and 6 are included to show that the invention is applicable to internal, and worm gearing. Fig. 7 shows conventional gears modified in accordance with my invention.

Referring now to Fig. 1; 10, 11, and 12 represent the spur gears of a gear train for transferring rotary motion between different shafts at selected speeds, depending on the gear ratios used. If gear 10 is assumed to be the driving gear rotating in a clockwise direction, gears 11 and 12 will be driven counterclockwise and clockwise, respectively, in the usual manner. However, if attempt is made to drive gear 11 from gear 10 with the latter rotating counterclockwise, the gears will lock. If gear 11 be considered the driving gear, it will drive gear 10 only in a counterclockwise direction, but it will drive gear 12 in either direction. It is noted that gear 11 has alternate peripherally wide and narrow teeth and alternate peripherally wide and narrow recesses between the teeth. This tooth formation may be obtained by using a wide toothed gear and cutting off from a half to two-thirds of the same side of every other tooth. Thus Fig. 3 shows such a wide toothed gear at 13 with only one tooth 14 thus cut off. The gears 10 and 12 have narrow teeth and wide recesses. If gear 11 be considered as being driven by gear 10, with the latter rotating clockwise, it may be stated that the front of every other tooth of gear 11 is cut off, leaving the back or driving surface side of the teeth of uniform pitch or spacing as in a normal gear. Hence, this direction of drive is normal and is the condition represented in Fig. 1.

If now the driving gear 10 be reversed so as to rotate counterclockwise, it is seen that the driving surfaces of gear 11 are of unequal pitch or spacing. When gear 10 first starts to rotate counterclockwise from the position shown, it will drive gear 11 until tooth $a$ clears tooth $b$. Then tooth $c$ will advance relative to tooth $d$ into driving contact with $d$ as shown in Fig. 2 and drive tooth $d$ a small distance, bringing tooth $e$ down on the top surface of tooth $f$, thereby locking the gears from further driving operation in this direction. Thus it is evident that gear 10 can only drive gear 11 with gear 10 rotating clockwise. If gear 11 be used as the driving gear, the uniformly pitched surfaces of the teeth must again be used as the driving surfaces, so that gear 11 can only drive gear 10 with gear 11 rotating clockwise and if attempt is made to reverse the direction of drive, the locking action will occur. By simply turning gear 11 over, the locking actions above described will occur for directions of operation reverse to those described above. No locking action occurs between gears 11 and 12 for either direction of operation because the intermeshing contact occurs between a sufficient number of teeth that relative displacement of the gears does not occur. Thus tooth $g$ is prevented from contacting the surface of tooth $h$ because of the driving engagement of the teeth to the left. However, a locking gear arrangement according to my invention could be made between gears 11 and 12 by cutting off the same side of a pair of corrective wide teeth. Thus if wide tooth $i$ were cut off as indicated in dotted lines, a locking action would occur here if gear 12, rotating counterclockwise, was driving gear 11. Thus the invention is applicable both to gears which mesh with only one driving tooth at a time as between gears 10 and 11, or with gears where several teeth mesh as between gears 11 and 12, and the same gear 11 may mesh with both types of gears with only one type performing a locking action. In any case where a locking action occurs, the gears are locked only in the locking direction and can be unlocked in that direction by making the driven gear the driving gear.

Thus it is seen that this form of one-way gear drive is quite flexible as to its manner of use and application and can be applied quite generally in a gear train by providing gears having the tooth arrangement described. It may be used, for example, in a self-starting, single-phase synchronous motor drive where the motor may start in either direction but only a selected direction of operation is desired.

It should be mentioned that where the one-way gear drive is employed to drive a load of the spring type as, for example, the winding of a spring, and the gear stops and reverses, the locking action will not occur until the back spring torque ceases because in such case, the spring in effect becomes a backward driving force to prevent shift of the gears to locking relation. Thus the device is not a substitute for a ratchet to prevent the spring from unwinding in a spring winding device.

Another limitation to be observed is explained as follows: Considering gears 10 and 11 of Fig. 1, if 10 is the driving gear rotating counterclockwise driving gear 11, and gear 11 tends to overrun gear 10 for any reason, as might be the case if gear 10 were slowed down suddenly, the gears will shift and lock. Hence, there is this possibility of locking action in both directions of rotation when gear 10 is the driving gear. However, if gear 11 is the driving gear rotating clockwise, and gear 10 tends to overrun, there is no locking action. In this case tooth e would strike the top of tooth f and momentarily stop gear e but tooth f can still move clockwise from under tooth e and resume the drive. Hence, where an overrun of the driven gear is likely to occur, it is best to make the gear having the different kinds of teeth, such as the gear 11 in Fig. 1, the driving gear because then no locking action can occur in the normal drive direction.

In any case where it is desired to have the locking occur at a particular point in the rotative position of the gears, the gear teeth will be modified for locking action only at such selected point. Thus in Fig. 3 only one tooth 14 of gear 12 has been cut off so that locking can occur only when this tooth is in meshing relation with gear 10. For another application I could cut off the opposite side of another large tooth of gear 13, Fig. 3, as indicated at 14a. With such an arrangement gear 10 could drive gear 13 in opposite directions between teeth 14 and 14a measured the long way around between them or for about three-fourths revolution of gear 13.

Fig. 4 represents a one-way drive where a tooth on the small gear 15 is modified for locking action and meshes with a large gear 16. With gear 16 used as the driving gear, the gears will lock at one point when gear 16 is rotating counter-clockwise.

The spur gear illustrated in Fig. 1 has slightly more than one-half of alternate large teeth cut off. This gives the locking action desired with the least backlash. The operation is, however, generally satisfactory where from one half to two-thirds of alternate large teeth are cut off, or in the case where several teeth mesh, as between gears 11 and 12 of Fig. 1, two consecutive large gear teeth may be cut off for a locking action. The best amount of cutting off will depend somewhat on the height of the teeth and the diameters and types of the gears employed but the exact amount is not critical.

In Fig. 5 an internal one-way locking gear is shown, and in Fig. 6 a one-way worm gear drive is shown which becomes locked when the gear wheel is driven by the worm in a counterclockwise direction.

In Fig. 7, I have shown a conventional spur gear drive modified to provide locking in one direction in accordance with my invention. Here the front side of one tooth in gear 17 has been cut back and the back side of one tooth in gear 18 has been cut back. If gear 18 be considered the driving gear and rotating clockwise, the drive is normal with the gears in correctly meshed relation. If, however, drive gear 18 be reversed, the extra backlash permitted by the cutaway part of the normal teeth, which is all in a direction away from a correctly meshed relation, is sufficient to bring the ends of the normal teeth to the right into locking engagement instead of into proper meshing engagement.

If in Fig. 7 the gears 17 and 18 be assumed to be of the same diameter and have the same number of teeth, the cutting away of the teeth in one direction alone is not sufficient to produce locking in either direction. Hence, if such gears were assembled where the cut-off portions of the teeth in both gears never meshed, there would be no locking action. If, now, the gears be assembled as shown but it be assumed that gear 18 is twice the diameter and has twice the number of teeth as gear 17 then we would have locking action in one direction of rotation for each revolution of the large gear but for every other revolution of the small gear. Again if one gear had fifty teeth and the other forty-nine locking action could occur only when the cut off teeth came into mesh or about fifty revolutions. This example will indicate the additional flexibility and application of my locking gear invention.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a gear drive a pair of intermeshed gears, one having uniformly spaced peripherally narrow teeth and the other having alternate peripherally wide and narrow teeth, the narrow teeth being from one-third to one-half the peripheral width of the wide teeth and so spaced that the gears function in a normal manner when the drive is in a given direction but lock when the direction of drive is reversed.

2. In a gear drive a pair of intermeshed gears, one gear having peripherally narrow teeth and the other gear having peripherally wide teeth, said wide toothed gear also having at least one peripherally narrow tooth of from one-third to one-half the width of a wide tooth and positioned as if formed by cutting off one side of a normally spaced wide tooth such that corresponding sides of the teeth in the gear having the wide and narrow teeth have an equal tooth pitch spacing but the reverse sides have an unequal tooth pitch spacing which causes locking when such reversed sides are used as the driving surfaces.

3. A one-way drive gear having alternate peripherally wide and narrow teeth, a narrow tooth being between one-third and one-half the width of a wide tooth, said teeth being positioned so that one side of all teeth have a uniform tooth pitch spacing.

4. A one-way gear drive comprising a pair of intermeshed gears, one gear having widely spaced peripherally narrow teeth and the other gear having similarly spaced peripherally wide teeth except at one point of its toothed surface where it has at least one peripherally narrow tooth between one-third and one-half the width of the wide teeth having one side surface uniformly spaced with respect to corresponding sides of the wide teeth.

5. A one-way gear drive comprising a pair of gears the teeth of which are continuously intermeshed and with the peripheral sides of the teeth on one side in both gears evenly spaced so as to permit of assembly and normal continuous driving operation between said gears in one direction where said evenly spaced gear teeth sides engage in driving relation, the peripheral tooth width of said gearing being reduced below normal in at least one position of engagement of said gears by an amount to allow extra backlash in the gearing of the order of one-half tooth pitch whereby when continuous driving operation between said gears is attempted in the other direction the gears rotate relative to each other when in such position of engagement until they are improperly meshed by an amount corresponding to said extra backlash whereby the outer ends of normal peripheral width teeth in the two gears which are adjacent to and approaching said position of engagement collide to lock the gears against further driving operation in said other direction.

CLARENCE W. HEWLETT, Jr.